United States Patent [19]

Webb

[11] 4,441,102
[45] Apr. 3, 1984

[54] FLOW SENSING APPARATUS

[75] Inventor: Charles E. Webb, Canada, Ky.

[73] Assignee: Basic American Industries, Indianapolis, Ind.

[21] Appl. No.: 222,121

[22] Filed: Jan. 2, 1981

[51] Int. Cl.³ .......................................... G08B 21/00
[52] U.S. Cl. .................................. 340/673; 340/529; 340/606; 340/608
[58] Field of Search ............... 340/606, 608, 610, 673, 340/674, 529; 241/34

[56] References Cited

U.S. PATENT DOCUMENTS

| | | | |
|---|---|---|---|
| 2,659,881 | 11/1953 | Bogot et al. | 340/608 |
| 2,798,215 | 7/1957 | Domingo et al. | 340/606 |
| 2,967,297 | 1/1961 | Ferguson | 340/606 |
| 3,284,788 | 11/1966 | Hudson | 340/606 X |
| 3,445,834 | 5/1969 | Street et al. | 340/606 |
| 3,493,951 | 2/1970 | Hartha et al. | 340/606 |
| 3,557,616 | 1/1971 | Landon, Jr. et al. | 73/228 |
| 3,686,926 | 8/1972 | Miller et al. | 73/61 R |
| 3,735,201 | 5/1973 | May | 340/529 X |
| 3,849,723 | 11/1974 | Allen | 73/61 R X |
| 3,878,103 | 4/1975 | Miller et al. | 210/243 |
| 4,103,292 | 7/1978 | Haas | 340/603 |
| 4,193,356 | 3/1980 | Vehe et al. | 340/608 X |
| 4,246,576 | 1/1981 | Grieve et al. | 340/606 |

Primary Examiner—John W. Caldwell, Sr.
Assistant Examiner—Joseph E. Nowicki
Attorney, Agent, or Firm—Woodard, Weikart, Emhardt & Naughton

[57] ABSTRACT

A flow sensing apparatus for providing an indication of the presence of an exiting flow stream from a coal processing plant cyclone includes a probe member disposed in the edge of the flow stream, an electronic sensing circuit cooperatively arranged with the probe member in order to provide either a high or a low level signal, depending upon whether the probe member is being contacted by the exiting flow stream or whether such contact is not being made. A display light is cooperatively arranged with the sensing circuit so as to flicker on and off as the exiting flow stream intermittently and irregularly contacts the probe member. The flickering of the display light indicating proper outlet flow from the coal processing plant cyclone while a constantly on condition of the light indicates that flow is not occurring. A time-delay circuit section is included so that if flow is blocked for a predetermined interval of time, an alarm sounds telling the operator that flow has been blocked and that corrective measures should be taken.

9 Claims, 2 Drawing Figures

FLOW SENSING APPARATUS

BACKGROUND OF THE INVENTION

The present invention relates in general to flow sensing apparata and in particular to such apparata which are cooperatively arranged with a coal processing plant cyclone in order to determine the presence of a flow stream from the cyclone outlet.

One very important stage in the mining and sorting of coal is the coal processing plant. As the coal is initially mined, pieces of rock become mixed with the coal and the mixture must be sorted. In certain instances, the coal is separated from the rock by means of a device called a cyclone. Any one coal processing plant may have a large number of such cyclones depending upon the volume of raw coal received. The type of cyclone employed in these processing plants operates as a separator between particles or pieces of one density (weight) and particles or pieces of a different density. By sorting the pieces according to size, density becomes the controlling factor of weight differential. The lighter pieces (coal) pass upwardly while the heavier pieces (rocks) pass downwardly. Consequently, it is important that the incoming mixture of coal and rock be crushed and sorted as to size before being introduced into a corresponding cyclone.

After the raw coal from the coal mine is crushed and then separated as to the size of rock and coal, several cyclones may be required to accommodate the various size groupings. Each coal and rock mixture is next mixed with water and directed into a corresponding cyclone under substantial pressure. While this slurry rotates around the body of the cyclone in a centrifugal manner, the heavier rock moves downwardly to an exit location and the lighter coal moves upwardly out of the top of the cyclone. The water and rock mixture exits the cyclone in a somewhat continuous flow manner and although this flow may be irregular in nature, it is critical to the operation of the cyclone that blockage of this cyclone outlet be identified at once. If blockage does occur, the operator must be able to tell so immediately in order to take the necessary precautionary steps and preclude rock and water from mixing with the pure coal that passes out the top of the cyclone.

At the present time, there is not believed to be any suitable means to sense when blockage occurs and to advise the operator of this fact. Consequently, in many present-day systems, rock will in fact mix with and thus pollute the otherwise relatively pure coal exiting from the top of the cyclone. If such polluting occurs for any length of time, the output product of the processing plant is substantially damaged. Although flow detection sensing systems are known to exist in the art as patented systems, none are specifically designed for sensing the outlet flow from a coal processing plant cyclone. Inasmuch as this particular type of flow stream sensing has a number of specific and unique requirements, any suitable flow sensing system must be specifically designed to accommodate these various uniquenesses. Listed below are potentially relevant references which offer some indication of the types of detection systems which have been conceived.

| U.S. Pat. No. | Patentee | Issue Date |
|---|---|---|
| 2,798,215 | Domingo et al. | 7/02/57 |

| U.S. Pat. No. | Patentee | Issue Date |
|---|---|---|
| 3,445,834 | Street et al. | 5/20/69 |
| 3,686,926 | Miller et al. | 8/29/72 |
| 3,878,103 | Miller et al. | 4/15/75 |
| 4,103,292 | Haas | 7/25/78 |
| 3,849,723 | Allen | 11/19/74 |
| 3,557,616 | Landon, Jr. et al. | 1/26/71 |

Domingo et al. discloses a liquid detecting device which relies upon the electrical conductivity of the liquid for its operation. Two conducting rings, separated by insulating rings, are disposed in an outlet pipe and these two conducting rings are electrically coupled to a plug in jack which is cooperatively arranged with a temperature-time indicating mechanism.

Street et al. discloses a liquid monitoring apparatus for detecting the existence of a flowing liquid in a pipe, the apparatus having laterally spaced probes adapted for axial insertion into the pipe. One probe is disposed at a low level in the pipe, the other probe is central. Only when there is sufficient flow through the pipe is the distance of separation bridged by the flowing liquid and an indicating circuit activated.

Miller et al. ('926) discloses a chip detecting and monitoring device for detecting conductive and nonconductive material present in a fluid system line. A woven screen of parallel conductive wires and perpendicular nonconductive wires is electrically coupled to a battery source and light. When a condutive particle bridges to adjacent conducting wires, the light is illuminated.

Miller et al. ('103) discloses a metal chip detecting and monitoring device similar to the above-mentioned Miller et al. ('926) device. This particular reference is a continuation of a divisional of the earlier reference and thus provides no new subject matter.

Haas discloses a material sensing device for sensing the level or the flow of solids such as grain, gravel or crushed stone. The device includes a flexible hose secured within a junction box with a light-sensitive diode at one end of the hose and a light-emitting diode at the opposite end. A positive flexure of the hose as produced by material contact causes an attenuation that is able to be sensed.

Allen discloses a method and apparatus for measuring the electrolytic conductivity of the liquid wherein a dialectric sorption medium is employed to conduct the liquid from an accessible, exposed portion into operative contacting association between a pair of spaced contact electrodes.

Landon, Jr. et al. discloses a particle flow sensing device which includes piezoelectric means supported on and activated by an elongated member placed in the flow path of a particle-entrained flow. An electrical signal being produced in response to impact of the particles on the elongated member.

While these various disclosures may be considered as relevant to the present invention, the closest disclosure is believed to be that of the Landon, Jr. et al. reference. However, the Landon device involves a means to sense particle flow by radial compression of one side of a piezoelectric cylinder. The compressive force is caused by solid particles striking an elongated member extending across the majority of the diameter of the flow conduit. Although the Landon, Jr. et al. reference is believed to be the most relevant of those above-listed patent disclosures, the Landon, Jr. et al. device relies upon particle contact for mechanical sensing in lieu of electrical contact.

A further difference between the present invention and all of the above-listed references is that none of these references involve sensing of the flow exiting from a coal processing plant cyclone. While it may be argued that flow sensing is in fact only flow sensing and it makes little difference what the associated apparatus is, it should be understood that there are various aspects to coal process plant operation which establish certain requisites for any flow sensing apparatus. First, due to the fact that the processing plant operator is having to keep track of many operations at one time, his review of the operator control panel presents a myriad of lights, gauges and buttons and it would be an improvement to provide a flashing or flickering light as an indication of a properly flowing exit stream from each cyclone. Such a flickering or flashling light is an improvement visually to the operator and provides a type of dynamic indication of the nature of the exiting flow at any instant of time. A further benefit to be afforded the operator is a warning alarm sound such that when flow ceases for a predetermined interval of time, even though the light may be constantly on, the operator is able to hear the warning and know that flow has stopped and may then shut down the cyclone so as to prevent rock from backing up and polluting the exiting pure coal.

In addition to the above-listed patent references, another item of possibly relevant technology is known to exist, yet sufficient details are not known to be able to discuss all aspects. This other, possibly relevant technology pertains to the design and operation of a scanning system employed at one time by Krebs Engineers of Menlo Park, Calif. This scanning system used a switch assembly positioned to intersect the exiting flow stream from a cyclone, and the switch assembly used is a mercury switch (paddle-type). It is known that this system never performed satisfactorily, possibly because of the disadvantages provided by use of a mechanical switch.

SUMMARY OF THE INVENTION

A flow sensing apparatus for providing an indication of the presence of an irregularly flowing flow stream from an outlet according to one embodiment of the present invention comprises an electrical contact probe member disposed in the flow stream, a sensing circuit cooperatively arranged with the probe member and adapted to rapidly provide a sequence of two different electrical signals, a first signal being generated by the sensing circuit when the nature of the flow stream is such so as to make contact with the probe member and a second signal being generated by the sensing circuit when the nature of the flow stream is such so as to avoid contact with the probe member and a display light cooperatively arranged with the sensing circuit for providing an indication of the presence of a flow stream, the display light flickering between a first mode caused by the first signal and a second mode caused by the second signal.

One object of the present invention is to provide an improved flow sensing apparatus.

Related objects and advantages of the present invention will be apparent from the following description.

DESCRIPTION OF THE PREFERRED EMBODIMENT

Figure 1:
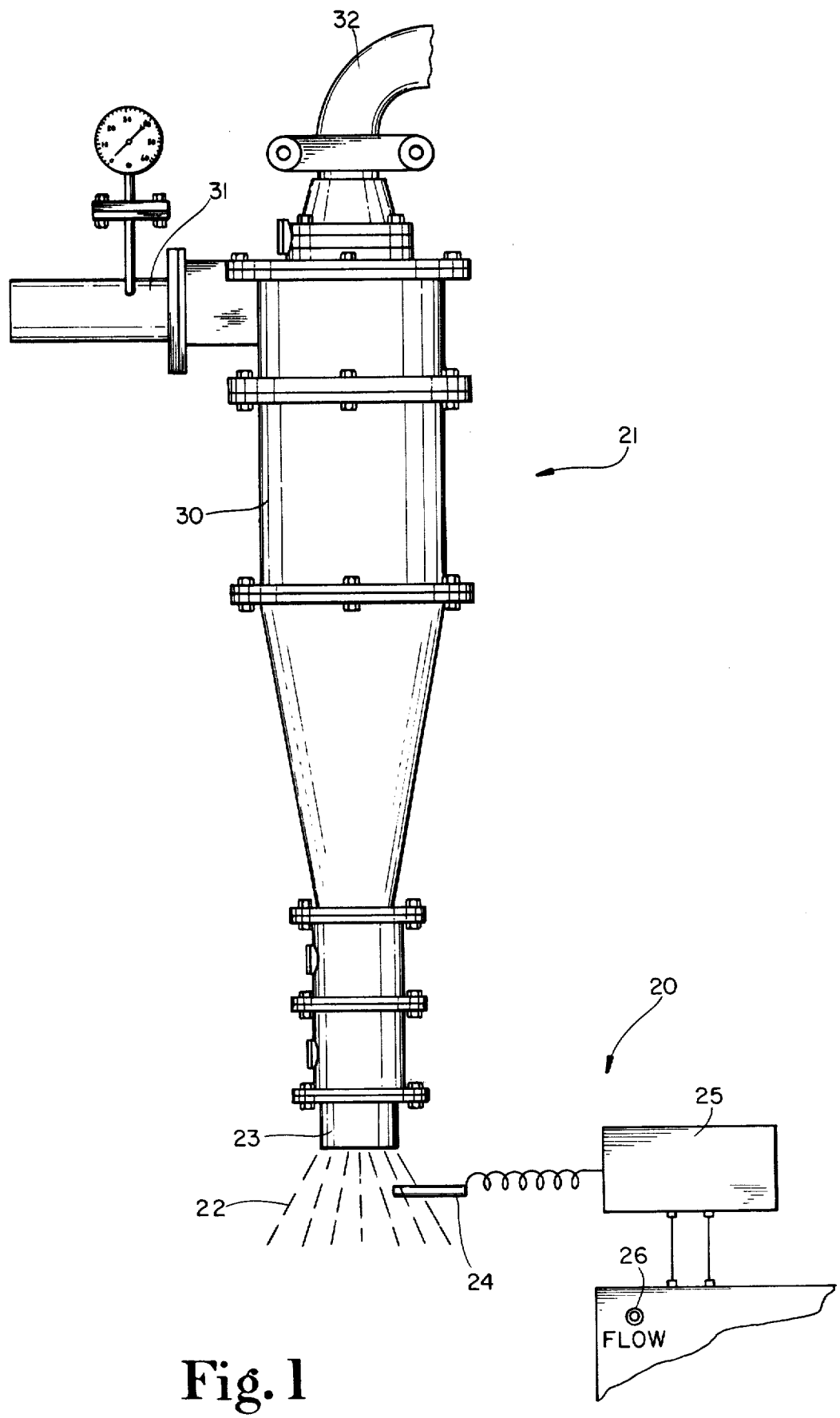
FIG. 1 is a diagrammatic, front elevation view of a flow sensing apparatus in combination with a coal processing plant cyclone according to a typical embodiment of the present invention.

For the purposes of promoting an understanding of the principles of the invention, reference with now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a flow sensing apparatus 20 cooperatively arranged with a coal processing plant cyclone 21 for indicating the presence of a flow stream (spray) 22 exiting from cyclone outlet 23. Apparatus 20 includes an electrical contact sensing probe 24 positioned in the outer edge of the flow stream, a sensing circuit 25 and a display light 26. Although the probe and display light are illustrated as being remote from sensing circuit 25, it should be clear from the schematic of FIG. 2 that these three subassemblies of apparatus 20 are all part of the same system but are physically separated (FIG. 1) due to their preferred locations relative to the operation of the coal processing plant cyclone 21.

The raw coal from a coal mine which is received at the processing plant comes mixed with rock. Due to present mining techniques, the presence of rock with the coal is virtually unavoidable. While processing plant cyclones are used to separate the rock from the coal, there are initial processing steps which must take place. First, the rock and coal mixture must be crushed and then sorted as to particle (piece) size. Each of the various particle size mixtures are then combined with water and introduced under pressure into a corresponding cyclone 21. It is to be understood that cyclone 21 represents only one cyclone of what may be many cyclones in any one coal processing plant. The illustrated cyclone is disposed vertically and is intended for relatively small pieces of coal and rock. Larger pieces of coal and rock are introduced into cyclones which are tilted at an angle of approximately 45 degrees.

The coal, rock and water mixture is introduced into the body 30 of the cyclone through inlet pipe 31, and since the density of rock is greater than that of coal, the somewhat similarly sized pieces of rock and coal are sorted by the cyclone's centrifugal action due to their weight differences. The heavier pieces of rock move downwardly through the cyclone ultimately exiting at outlet 23 with the water and this rock and water mixture forms flow stream 22. The lighter coal moves upwardly out of the top of the cyclone by means of passageway 32. Due to the potential problems caused if outlet 23 becomes blocked, and in view of the likelihood of such blockage, it is important for the cyclone operator, who is normally at a remote location, to be able to have some warning of or means for signaling flow stoppage. Further, it is also important for the operator to be able to tell when flow is occurring in a normal manner. The use of sensing apparatus 20 provides a constant indicator of proper flow as well as a warning alarm if flow ceases for a predetermined interval of time. The indication of proper flow as well as the warning means are fully disclosed by the circuit schematic set forth in FIG. 2.

Due to the abrasive nature of the exiting flow stream, the sensing probe must be very durable as well as strong. While there are any number of mechanical means to securely position the sensing probe in the flow stream, material selection becomes quite important. A very rigid and abrasive-resistant material is best, such as, for example, carbide. In the exemplary embodiment, a carbide drill bit is used as the sensing probe. Since the present invention operates on the basis of electrical potential of the probe, as controlled by the presence of the flow stream, the mechanical aspects of the probe's connection to the remainder of the apparatus are not critical. This is in contrast to those systems such as that of U.S. Pat. No. 3,557,616 (Landon, Jr. et al.) where the mechanical relationship of the probe to the other portions of the device is very important. Further, this single-piece, electrically conductive probe eliminates all durability and reliability problems which plague the use of mechanical switches (such as mercury switches) which might be cooperatively arranged with the flow stream, such as by a paddle to activate the switch.

Figure 2:
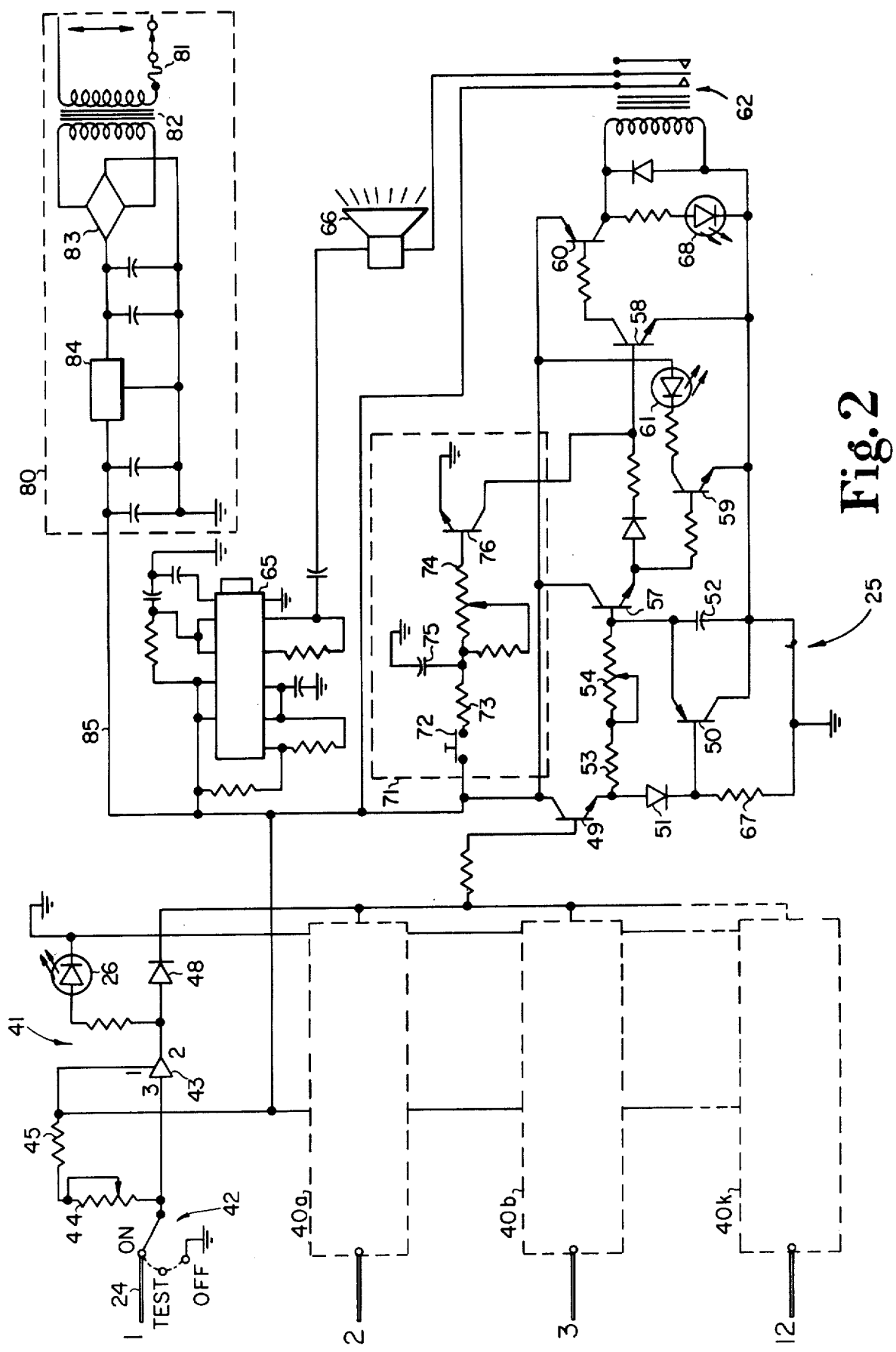
FIG. 2 is an electrical schematic of the FIG. 1 flow sensing apparatus.

Referring then to FIG. 2, probe 24 represents the sensing probe of FIG. 1. However, since many cyclones (up to twelve) are simultaneously operable with a single sensing circuit 25, phantom boxes 40a–40k represent eleven additional circuit portions equivalent in all regards to the portion illustrated in detail as portion 41. Probe 24 is coupled to a three-position switch 42 (including on, test, and off) which in turn is coupled to amplifier 43 which may be, for example, a CMOS 4050. The output of amplifier 43 is coupled to light-emitting diode 26 (the display light of FIG. 1).

With sensing probe 24, properly positioned relative to outlet 23, when a water and rock mixture of a normal flow volume is discharged from the outlet (flow stream 22), light 26 flickers in a rapid, irregular sequence. Such flickering is caused by the irregularity of the flow stream and the nonhomogenous nature of the rock and water mixture. As this mixture intermittently and irregularly contacts probe 24, the probe is placed into either a high or low potential. When the flow stream is not hitting the probe, the probe is pulled up to a positive potential (high) through resistors 44 and 45 placing a high on the input (pin 3) of amplifier 43. This causes the output of amplifier 43 (pin 2) to go high which turns on (illuminates) display light 26. When the flow stream is hitting the probe, the probe is pulled low (negative potential) creating a low at both pins 3 and 2 of amplifier 43 and light 26 remains dark (off).

When pin 3 of amplifier 43 is at a high level, the line through switching diode 48 is also at a high level turning on transistor 49 and turning off transistor 50 via diode 51. Capacitor 52 begins to charge slowly by way of resistors 53, 54 with the time adjustment being afforded by resistor 54. As the voltage at capacitor 52 increases, the level at the base of transistor 57 increases and the output of transistor 57 goes from low to high at the same rate as the charging of capacitor 52. As the output of transistor 57 goes from low to high, transistors 58, 59 and 60 are activated. Transistor 59 turns on light-emitting diode 61 while transistor 58 turns on transistor 60. Transistor 60 energizes relay 62 which completes the alarm circuit through oscillator 65 (an LM556CM) causing speaker 66 to sound.

When the flow stream is hitting probe 24, its potential is brought to a low level which causes the input of amplifier 43 to go low as well as the output (pin 2) which turns off LED 26 and switches diode 48. The switching of diode 48 causes transistor 49 to turn off and transistor 50 to turn on through resistor 67 which short-circuits both capacitor 52 and the base of transistor 57 to ground, instantly. Correspondingly, transistors 57, 58 and 59; relay 62; speaker 66, and LED's 61 and 68 are turned off. Thus, as probe 24 is alternately, although irregularly, contacted by the flow stream, indicator light 26 flickers on and off. Further, if there is a sufficient interval of time when the flow stream is not hitting the probe, the "alarm" portion of the circuit (that portion from transistor 49 to speaker 66) is activated as a warning to the operator that blockage to the flow stream has occurred. This alarm portion of the circuit is important because of the possibility that the operator may not be able to keep track of how long the indicator light 26 is in a constantly on condition, created by flow blockage. The flickering of this light provides a dynamic indication of the flow and is easily visible by the operator, the light may stay on for a few seconds and not represent a flow blockage condition. However, if the operator does not ascertain when the light first went on and how long it has been on, a more major flow blockage condition could be resulting and the operator would not be aware of the problem. This is the reason for the alarm portion of the circuit.

Circuit section 71 is an instant off, time-delay (adjustable) on circuit section including switch 72, resistors 73 and 74, capacitor 75 and transistor 76. When switch 72 is depressed, capacitor 75 is energized and the base of transistor 76 goes high, closing the transistor and placing the collector of transistor 76 at a low potential. The connection of the collector of transistor 76 to the base of transistor 58 means that when transistor 76 is on, transistor 58 is off. Thus, circuit section 71 is able to be used as a main switch for turning off the speaker (silencing the alarm) as an alternative to individually placing all of the probe switches, such as 42, into an "off" position.

Circuit section 80 represents the power supply means for the present invention. An external 120-volt AC source is coupled by way of fuse 81 to transformer 82 and from there to diode bridge 83. The arrangement of capacitors in combination with 12-volt, voltage regalator 84 provides a positive 12-volt DC regulated potential on line 85.

Due to the possible variations in electronics as caused by individual part tolerances, and in view of the variable nature of the exiting flow stream, adjustable resistor 44 permits varying of the pick-up sensitivity of the probe. Further, each probe in the group of probes 1–12 is able to be individually adjusted to a precise pick-up sensitivity by the corresponding adjustable resistor. While the present flow sensing apparatus and in particular, the sensing circuit has been disclosed in the environment of a coal processing plant and has been cooperatively arranged with a separating cyclone, it is to be understood that the electronics and the sensing concept disclosed herein are in fact applicable to other situations and uses.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A flow sensing apparatus for providing an indication of the presence of an irregularly flowing stream from an outlet, said flow sensing apparatus comprising:
   an electrical contact probe member disposed in said stream;
   a sensing circuit cooperatively arranged with said probe member and adapted to rapidly provide a sequence of two different signals, a first signal being generated by said sensing circuit when the stream makes contact with said probe member, and a second signal being generated by said sensing circuit when said stream does not make contact with said probe member; and
   a display light cooperatively arranged with said sensing circuit for indicating the presence of said irregularly flowing stream, said display light switching on in response to one of said first or second signals, and said display light switching off in response to the other of said signals so as to produce a flickering light indicating the dynamic conditions of said irregularly flowing stream.

2. The flow sensing apparatus of claim 1 wherein said electrical contact probe member is a carbide drill bit.

3. The flow sensing apparatus of claim 1 wherein said first signal is a low potential, in response to which said display lamp switches off.

4. The flow sensing apparatus of claim 1 wherein said second signal is a high potential, in response to which said display lamp switches on.

5. The flow sensing apparatus of claim 1 wherein said sensing circuit comprises:
   (a) a display light circuit section;
   (b) an alarm circuit section; and
   (c) a power supply circuit section.

6. The flow sensing apparatus of claim 5 wherein said alarm circuit section includes time-delayed charging means suitably arranged for generating an alarm signal in response to the presence of a continuous second signal for a predetermined interval of time.

7. The flow sensing apparatus of claim 6 which further includes an instant-off, time-delay on circuit section for terminating said alarm signal.

8. The flow sensing apparatus of claim 5 which further includes a plurality of display lights and a corresponding plurality of display light circuit sections, each of said display light circuit sections corresponding to a different probe member and a different stream, said display lights providing a simultaneous indication of the dynamic flow conditions of each different stream.

9. The flow sensing apparatus of claim 8 wherein each display light circuit section includes adjustment means for varying the electrical sensitivity of its corresponding probe member.

* * * * *